US012595812B1

(12) United States Patent
Araujo et al.

(10) Patent No.: US 12,595,812 B1
(45) Date of Patent: Apr. 7, 2026

(54) ADHESIVE-FREE ENCAPSULATED MAGNETIC MOUNTING BASE

(71) Applicant: Tractian Technologies Inc, Atlanta, GA (US)

(72) Inventors: Marlon Douglas do Nascimento Araujo, São Paulo (BR); Flávio Roberto Bizerra Junior, São Paulo (BR); João Cadorin Falleiros, São Paulo (BR); Vinicius Martim, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/314,997

(22) Filed: Aug. 29, 2025

(51) Int. Cl.
| | |
|---|---|
| *F16B 1/00* | (2006.01) |
| *F16B 7/18* | (2006.01) |
| *G01M 99/00* | (2011.01) |

(52) U.S. Cl.
CPC ................. *F16B 1/00* (2013.01); *F16B 7/18* (2013.01); *G01M 99/005* (2013.01); *F16B 2200/83* (2023.08)

(58) Field of Classification Search
CPC .......... F16B 1/00; F16B 7/18; F16B 2200/83; G01M 99/005; B23Q 3/00; B23Q 3/1543; B23Q 3/1546
USPC ............................................................ 269/8
See application file for complete search history.

(56) References Cited

U.S. PATENT DOCUMENTS

| | | |
|---|---|---|
| 935,151 A | 9/1909 | Harrell |
| 2,679,709 A | 6/1954 | Du Bois |

| | | | |
|---|---|---|---|
| 2,920,595 A | * | 1/1960 | Gertz ....................... B23K 3/08 |
| | | | 29/745 |
| 3,937,436 A | | 2/1976 | Stewart |
| 4,003,169 A | | 1/1977 | Young, II |
| 4,257,570 A | | 3/1981 | Rasmussen |
| 4,822,656 A | | 4/1989 | Hutter, III |
| 5,876,023 A | | 3/1999 | Hain et al. |

(Continued)

OTHER PUBLICATIONS

Li, Xinyu. "Optimal design of low frequency rubber vibration isolator." Journal of Physics: Conference Series. vol. 2798. No. 1. IOP Publishing, 2024.

*Primary Examiner* — Sarang Afzali
*Assistant Examiner* — Darrell C Ford
(74) *Attorney, Agent, or Firm* — Cognition IP, P.C.; Edward Steakley; Justin White

(57) ABSTRACT

A mounting base that couples a mechanical component to a mechanical asset includes an outer housing, a permanent magnet, a compression insert, and a retention lock. The outer housing has wall(s) coupled to an endcap to define an inner volume. The endcap includes an outer surface to attach the mounting base to the mechanical asset. The permanent magnet is within the inner volume and generates a magnetic force to hold the mounting base against the mechanical asset. The compression insert is fitted within the outer housing such that the permanent magnet is constrained within the inner volume and includes a threaded inner opening that accepts insertion of the mechanical component. Full insertion of the mechanical component encapsulates the permanent magnet within the mounting base. The retention lock is within the inner volume between and contacting both the compression insert and the permanent magnet and prevents movement of the permanent magnet.

20 Claims, 9 Drawing Sheets

(56) References Cited

U.S. PATENT DOCUMENTS

| | | | |
|---|---|---|---|
| 6,220,562 B1 | 4/2001 | Konkle | |
| 6,296,431 B1 | 10/2001 | Miller | |
| 6,418,685 B1 | 7/2002 | Oliver et al. | |
| 6,644,637 B1 * | 11/2003 | Shen | B25B 5/061 |
| | | | 269/152 |
| 6,652,208 B2 | 11/2003 | Gillis | |
| 6,880,788 B2 | 4/2005 | Stephen | |
| 6,928,783 B2 | 8/2005 | Oliver et al. | |
| 7,241,097 B2 | 7/2007 | Dembowsky et al. | |
| 8,011,206 B2 | 9/2011 | Imai | |
| 8,350,663 B1 * | 1/2013 | Michael | B23Q 3/1546 |
| | | | 338/288 |
| 8,770,902 B1 | 7/2014 | Miller | |
| 8,854,829 B1 | 10/2014 | Bopp et al. | |
| 8,920,063 B1 | 12/2014 | Easley | |
| 9,115,744 B1 * | 8/2015 | Bulow | F16B 19/1036 |
| 9,212,675 B2 | 12/2015 | Oetlinger | |
| 9,970,190 B2 | 5/2018 | Benthien et al. | |
| D928,593 S | 8/2021 | Altamura | |
| 11,629,776 B2 | 4/2023 | Corey | |
| 2007/0220717 A1 | 9/2007 | Brinson | |
| 2010/0301532 A1 * | 12/2010 | Cardone | B23Q 3/154 |
| | | | 248/206.5 |
| 2011/0037547 A1 * | 2/2011 | Cardone | B25B 11/002 |
| | | | 335/289 |
| 2013/0232731 A1 | 9/2013 | Schradin et al. | |
| 2016/0184981 A1 * | 6/2016 | Kanda | B25B 11/002 |
| | | | 269/8 |
| 2017/0053725 A1 * | 2/2017 | St. Onge | F16M 11/041 |
| 2018/0154583 A1 | 6/2018 | Evans et al. | |
| 2020/0219641 A1 * | 7/2020 | Nellessen | B25B 11/002 |
| 2020/0277977 A1 * | 9/2020 | Lindblad | F16B 1/00 |
| 2021/0122011 A1 * | 4/2021 | Kitaura | B23Q 3/1543 |
| 2021/0247185 A1 * | 8/2021 | Westermark | H01F 7/02 |
| 2021/0268615 A1 * | 9/2021 | Morton | B25B 11/002 |
| 2022/0277876 A1 * | 9/2022 | Kojima | H01F 7/04 |
| 2024/0001708 A1 * | 1/2024 | Guinea | B60B 3/14 |
| 2024/0392823 A1 | 11/2024 | Gurusamy et al. | |

* cited by examiner

100

132    130

110

ADHESIVE-FREE ENCAPSULATED MAGNETIC MOUNTING BASE

CROSS-REFERENCE TO RELATED APPLICATIONS

This application is related to commonly owned U.S. patent application Ser. No. 19/281,246 filed on Jul. 25, 2025, titled "ADHESIVE BASED MOUNTING ASSEMBLY;" U.S. patent application Ser. No. 19/297,904 filed on Aug. 12, 2025, titled "SELF-ALIGNING THREADED MOUNTING ASSEMBLY;" and U.S. patent application Ser. No. 19/304,380 filed on Aug. 19, 2025, titled "SAFETY ANCHORING ACCESSORY;" which applications are hereby incorporated by reference in their entireties herein.

TECHNICAL FIELD

The present disclosure relates generally to mechanical coupling arrangements, and more particularly to improved mounting devices for coupling mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation relative to any industrial equipment to which it is coupled and intended to monitor. This is often accomplished using mounting assemblies with threaded attachment features. Where threaded mountings are not possible for a given application, mounting assemblies that involve glued, welded, or otherwise attached magnetic bases can sometimes be used.

Unfortunately, magnetic mounting bases commonly used in industrial environments tend to degrade over time due to exposure to moisture, chemicals, and vibration, among other environmental factors. Traditional magnet usage methods often rely on adhesives, which can involve long curing times, can weaken with age, and cannot guarantee mechanical integrity under harsh conditions. Additionally, exposed or loosely retained magnets can pose a critical risk of spark generation in explosive atmospheres, which can result in such magnetic base arrangements unsuitable for use in ATEX ("Atmosphere Explosible") classified zones.

Although traditional ways of coupling industrial items with mounting assemblies that use magnetic mounting bases have worked in the past, improvements are always helpful. In particular, what is desired are magnetic mounting base arrangements having secure and unexposed magnetic components for improved durability that still provide precise rotational alignments for coupled items.

SUMMARY

It is an advantage of the present disclosure to provide improved magnetic mounting base arrangements having secure and unexposed magnetic components for improved durability that still provide precise rotational alignments for coupled items. The disclosed features, apparatuses, systems, and methods relate to mounting assemblies that include magnetic mounting bases. In particular, the disclosed embodiments can involve magnetic mounting bases having mechanically interlocking outer housings, permanent magnets, retention locks, and compression inserts that facilitate the ready coupling of a mechanical component to a mechanical asset at a specific rotational alignment in a simple and streamlined manner using magnets that are encapsulated to be adhesive-free, spark-free, and corrosion resistant.

In various embodiments of the present disclosure, a mounting base can include an outer housing, a permanent magnet, a compression insert, and a retention lock. The outer housing can have one or more walls coupled to an endcap at one end to define an inner volume having a housing opening at another end opposite the endcap. The outer housing can have a longitudinal axis therethrough, and the endcap can include an outer surface configured to facilitate attachment of the mounting base to a separate mechanical asset. The permanent magnet can be located within the inner volume proximate the endcap and can be configured to generate a magnetic force with respect to the separate mechanical asset to facilitate holding the mounting base against the separate mechanical asset. The compression insert can be fitted within the housing opening such that the permanent magnet is constrained within the inner volume. The compression insert can include a threaded inner opening aligned along the longitudinal axis and configured to accept a rotational insertion therein of a threaded portion of a separate mechanical component such that the separate mechanical component is coupled to the separate mechanical asset. Full insertion of the separate mechanical component into the threaded inner opening can encapsulate the permanent magnet within the mounting base. The retention lock can be located within the inner volume between the compression insert and the permanent magnet. The retention lock can contact both the compression insert and the permanent magnet and can prevent movement of the permanent magnet within the inner volume.

In various detailed embodiments, the separate mechanical asset can be an industrial engine and the separate mechanical component can be a vibration sensor. Other types of separate mechanical assets and components are also possible. The endcap outer surface, which can be a bottom surface, can be configured to be adhered to the separate mechanical asset using an adhesive or welded to the separate mechanical asset. In some arrangements, the mounting base can be configured such that full insertion of the separate mechanical component into the threaded inner opening results in the separate mechanical component being coupled to the separate mechanical asset at a specific rotational orientation relative to the separate mechanical asset. The one or more walls of the outer housing can define an outer surface that includes at least one pair of opposing flat regions. Also, the compression insert can be rigidly coupled to the outer housing within the housing opening such that the compression insert is laterally and rotationally fixed with respect to the outer housing. For example, the compression insert can be press fit within the outer housing.

In further detailed embodiments, an internal thread of the threaded inner opening can have a rotational orientation arranged to match an exterior feature of the outer housing. In such instances, tightening the threaded portion of the separate mechanical component into the threaded inner opening of the compression insert to a specified torque value can result in achieving an exact rotational orientation of the separate mechanical component relative to the exterior feature of the outer housing. The outer housing can include an upper surface configured to contact and provide a physical stop against a bottom surface of the separate mechanical component when the threaded portion of the separate mechanical component is inserted into and sufficiently rotated within the threaded inner opening. In such instances, the compression insert can have an upper surface arranged to be lower than or flush with the upper surface of the outer housing. In various arrangements, the outer housing can include stainless steel, the permanent magnet can include neodymium, the compression insert can include stainless steel, and the retention lock can include rubber. Encapsulating the permanent magnet within the mounting base can result in a permanent magnet environment that is sealed, adhesive-free, spark-free, and corrosion resistant.

In further embodiments of the present disclosure, an adhesive-free encapsulated magnetic mounting base configured to mount a separate mechanical component to a separate mechanical asset can include a housing, a magnet, and an insert. The housing can have one or more walls coupled to an endcap to define an inner volume having a housing opening opposite the endcap. The endcap can include an outer surface configured to facilitate attachment of the magnetic mounting base to a separate mechanical asset. The magnet can be located within the inner volume proximate the endcap and can be configured to generate a magnetic force with respect to the separate mechanical asset to facilitate holding the magnetic mounting base against the separate mechanical asset. The insert can be fitted within the housing opening such that the magnet is constrained within the inner volume. The insert can include a threaded inner opening configured to accept insertion of a threaded portion of a separate mechanical component.

In various detailed embodiments, a specific rotational orientation of the separate mechanical component can be achieved automatically when the separate mechanical component is tightened into the threaded inner opening at a designated preset torque value. Also, the magnet can be isolated from an ambient environment outside the magnetic mounting base when the separate mechanical component is tightened into the threaded inner opening.

In still further embodiments of the present disclosure, various methods of mounting a separate mechanical component to a separate mechanical asset using a magnetic mounting base are provided. Pertinent process steps can include setting a rotational orientation of the magnetic mounting base, fastening the magnetic mounting base to the separate mechanical asset, and coupling the separate mechanical component to the magnetic mounting base. The rotational orientation can be set with respect to the separate mechanical asset. The magnetic mounting base can include an outer housing, a permanent magnet, a compression insert, and a retention lock. Coupling the separate mechanical component to the magnetic mounting base can include rotatably inserting a threaded portion of the separate mechanical component into a threaded inner opening of the compression insert while the compression insert is fitted within an inner volume of the outer housing. This can result in the permanent magnet being encapsulated into a sealed, adhesive-free, spark-free, and corrosion resistant environment within the magnetic mounting base. This can also result in coupling the separate mechanical component to the separate mechanical asset at a specific rotational orientation relative to the separate mechanical asset. Additional process steps can include creating the mounting base, tightening the separate mechanical component into the compression insert to a proper torque, and confirming that a specific rotational orientation of the separate mechanical component is a proper relative rotation of the separate mechanical component to the separate mechanical asset.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for magnetic mounting bases, which can be used to mount or otherwise couple a separate mechanical component to a separate mechanical asset. These drawings in no way limit any changes in form and detail that may be made to the disclosure by one skilled in the art without departing from the spirit and scope of the disclosure.

DETAILED DESCRIPTION

Figure 1A:
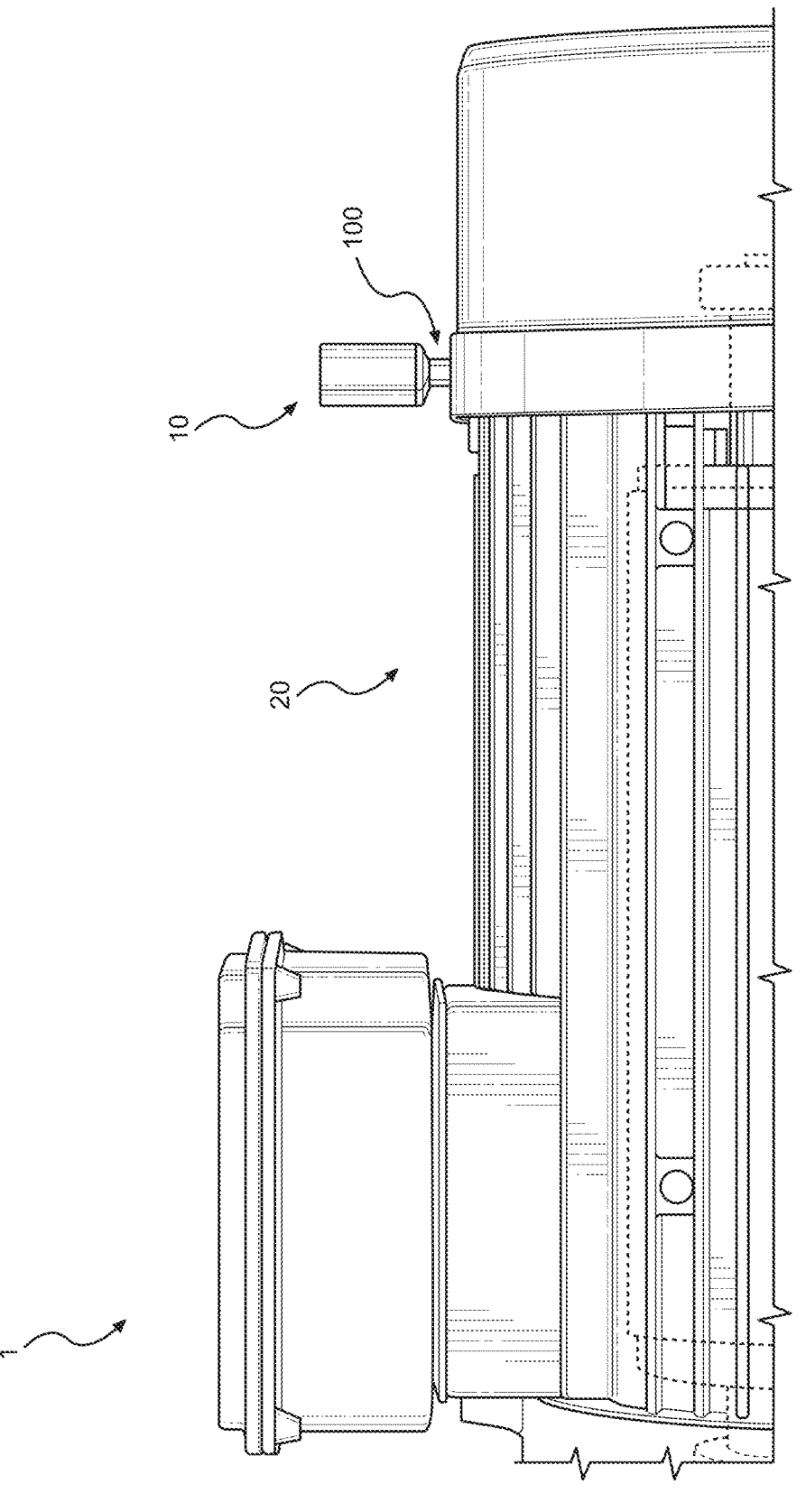
FIG. 1A illustrates in side elevation view an environment with a mechanical component coupled to a mechanical asset using an example magnetic mounting base according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving magnetic mounting bases. In particular, this can include magnetic mounting bases configured to mount a separate mechanical component to a separate mechanical asset in a manner that provides for specific rotational alignments for the coupled items. In general, a magnetic mounting base can be affixed or otherwise coupled to a separate mechanical asset, whereupon a mechanical component can be mounted or otherwise coupled to the affixed magnetic mounting base. Alternatively, the mechanical component can be coupled to the magnetic mounting base whereupon the magnetic mounting base with the mechanical component coupled thereto can then be coupled to the mechanical asset. In some specific arrangements, the mechanical component can be an industrial sensor, such as a vibration sensor, while the mechanical asset can be industrial mechanical equipment, such as an industrial motor.

As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, and rotational alignment with respect to its tracked item. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration. As noted above, mounting assemblies with threaded attachment features can be used to facilitate such results. These types of mounting arrangements often require the creation of a threaded opening in a target mechanical asset, however, which may not be possible or practical in some situations.

Where threaded mountings are not possible for a particular application, mounting assemblies that involve magnetic bases can sometimes be used. Unfortunately, magnetic bases can degrade over time due to environmental factors, can rely on adhesives that adversely affect some magnetic materials, and can pose a critical risk of spark generation in explosive atmospheres due to the inherent properties of some magnetic materials. These drawbacks can all be addressed through the use of various embodiments disclosed herein directed to magnetic mounting bases with adhesive-free encapsulation for spark-free and corrosion-resistant industrial mounting of mechanical components to mechanical assets. The disclosed embodiments can involve magnetic mounting bases having multiple items that are mechanically interlocked into a combined unit, which items can include a rigid outer housing, a permanent magnet, a compression insert, and an optional retention lock, among other possible items and features.

Although various embodiments disclosed herein discuss the specific application of mounting a vibration sensor to an industrial motor, it will be readily appreciated that the disclosed features, apparatuses, systems, and methods for mounting bases can also be used in other applications and environments where generically mounting a separate mechanical component to a separate mechanical asset is desired. Furthermore, while some examples are provided for specific tools, components, and materials, it will be understood that these can be replaced with any suitable substitute or alternative tools, components, and/or materials that take advantage of the disclosed features. Other applications, arrangements, and extrapolations beyond the illustrated embodiments are also contemplated.

Referring first to FIG. 1A, an environment with a mechanical component coupled to a mechanical asset using an example magnetic mounting base is illustrated in side elevation view. Industrial environment 1 can include a relatively smaller mechanical component 10 that is mounted to a relatively larger mechanical asset 20 by way of a magnetic mounting base 100. In various arrangements, mechanical component 10 can be a sensor, such as a vibration sensor, for example. Other types of sensors are also possible, such as, temperature, current, pressure, and moisture sensors, with other types of mechanical components suitable for mounting also being possible. In various arrangements, mechanical asset 20 can be a manufacturing or industrial item, such as an industrial motor, although other types of mechanical assets are also possible.

As is generally well known, there are many different ways to mount separate components within an industrial setting or environment, and some mounting techniques involve controlling for a specific or precise rotational orientation of mounted components. Such a specific rotational orientation can be desirable where mechanical component 10 is a vibration sensor that is mounted to a larger vibrating mechanical asset 20, such as an industrial motor, for example. Magnetic mounting base 100 can be configured to mount mechanical component 10 to mechanical asset 20 in a manner that results in a specific rotational orientation of mechanical component 10 with respect to mechanical asset 20. Magnetic mounting base 100 can be designed to facilitate such a rotationally precise mounting in a convenient and streamlined manner based on its interlocking component arrangement, as set forth in greater detail below.

Figure 1B:
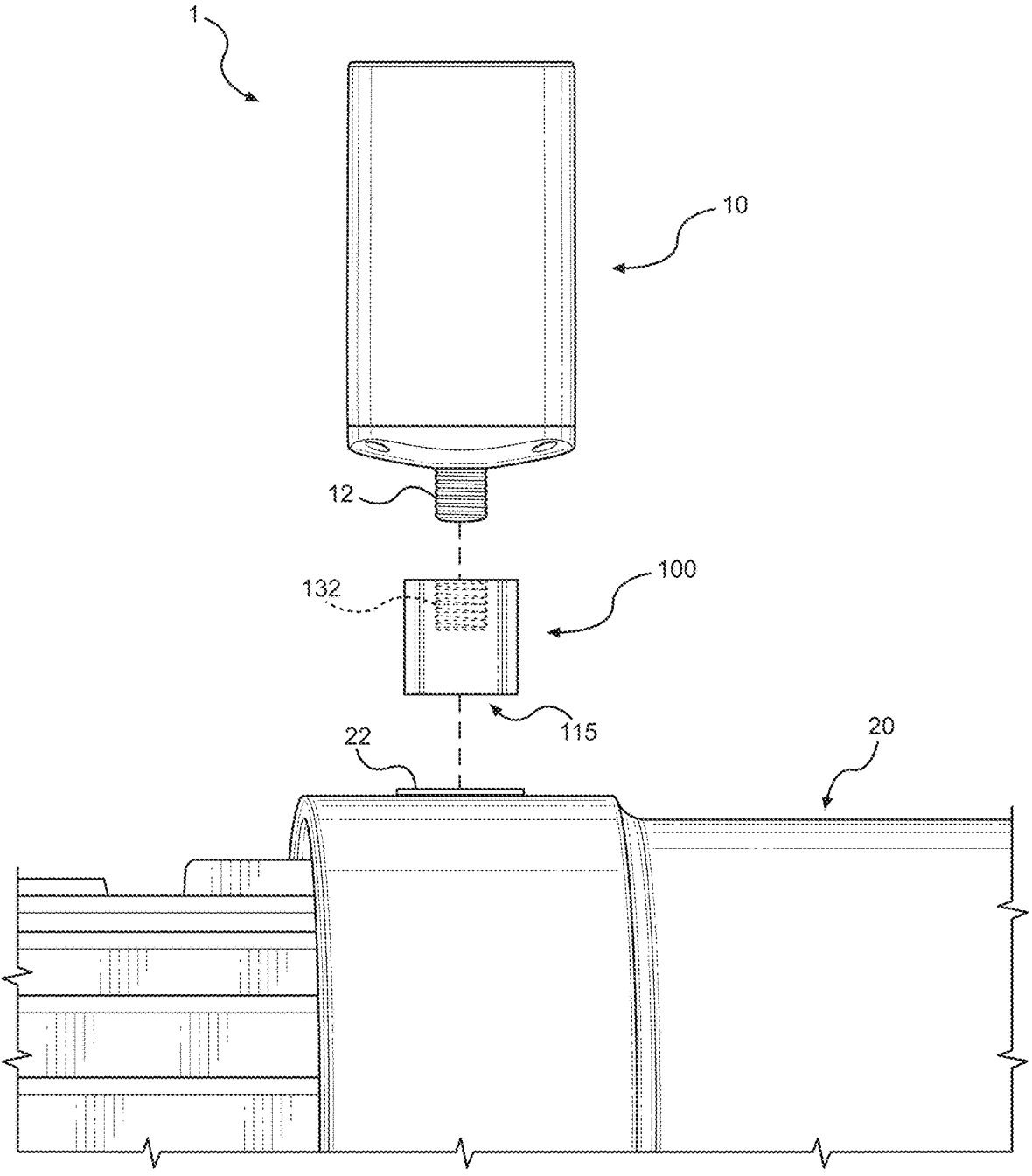
FIG. 1B illustrates in side exploded close-up view the environment of FIG. 1A with the mechanical component, mechanical asset, and magnetic mounting base all uncoupled from each other according to one embodiment of the present disclosure.

FIG. 1B illustrates in side exploded close-up view the environment of FIG. 1A with the mechanical component, mechanical asset, and example magnetic mounting base uncoupled from each other. In some arrangements, mechanical component 10 and mechanical asset 20 can be separate items that are already available with a desire to mount, attach, or otherwise couple the mechanical component to the mechanical asset, such as by way of using magnetic mounting base 100. Mechanical component 10 can be relatively smaller compared with mechanical asset 20 such that coupling these items together can involve moving and mounting a vibration sensor or other smaller portable mechanical component along with magnetic mounting base 100 onto an industrial motor or other larger stationary mechanical asset.

In various embodiments, magnetic mounting base 100 can be attached or coupled in one or more ways to both mechanical component 10 and mechanical asset 20, and this can involve one or more features on each of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor to another item. Magnetic mounting base 100 can have a threaded inner opening 132 configured to receive threaded portion 12 of mechanical component 10 to facilitate directly attaching or otherwise coupling these two items, such as by rotational insertion of threaded portion 12 into threaded inner opening 132. Magnetic mounting base 100 can also have an outer surface 115 configured to facilitate attachment of the mounting base to a surface region 22 of mechanical asset 20. This outer surface 115 can be, for example, a flat surface at the bottom of magnetic mounting base 100 that is configured for attachment to surface region 22. Further descriptions for each of these items and features are provided in greater detail below.

Figure 2:
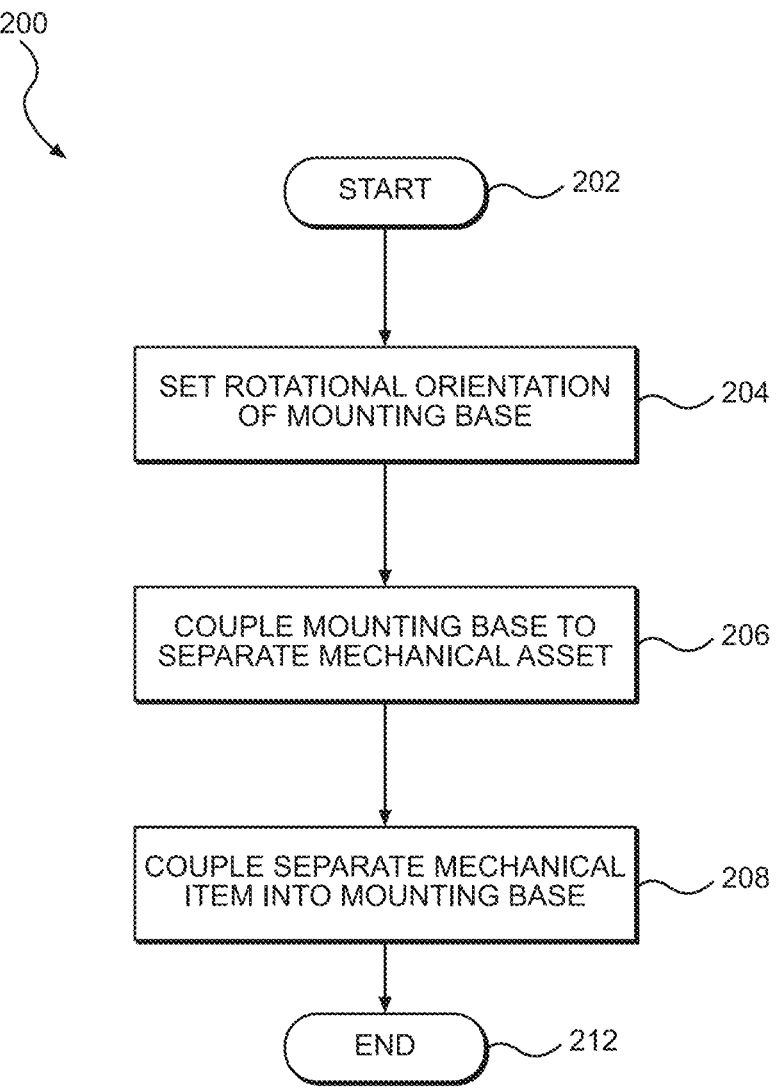
FIG. 2 illustrates a flowchart of an example summary method of mounting a mechanical component to a mechanical asset using a magnetic mounting base according to one embodiment of the present disclosure.

Moving next to FIG. 2, a flowchart is provided of an example summary method of mounting a mechanical component to a mechanical asset using a magnetic mounting base. Summary method 200 can represent one broad aspect of various overall methods of mounting a separate mechanical component to a separate mechanical asset, and it will be understood that various other steps and details of such a broad aspect and overall methods are not provided here for purposes of simplicity. While summary method 200 and other disclosed methods can involve mounting a vibration sensor to an industrial motor, for example, it is also contemplated that the various disclosed methods can alternatively be applied to other types of mechanical components and mechanical assets.

After a start step 202, a first process step 204 can involve setting a rotational orientation of the magnetic mounting base with respect to the separate mechanical asset. In some arrangements, the magnetic mounting base can include an outer housing, a permanent magnet, a compression insert, and a retention lock, as detailed below. Setting the rotational orientation can involve setting a rotational orientation of a mounting base outer housing with respect to the mechanical asset. This can be done by adjusting the outer housing such that flat regions or other notable features on the outside of the outer housing are at a desired orientation or location with respect to the mechanical asset.

At a following process step 206, the magnetic mounting base can be coupled to the separate mechanical asset. This can be done, for example, by fastening the outer housing of the mounting base to a suitable surface region of the mechanical asset. In some arrangements this can involve fastening an outer surface of the mounting base outer housing, such as a flat surface at the bottom of the outer housing. Fastening can involve any suitable fastening method, such as welding, gluing, or otherwise adhering, for example, among other possible fastening techniques. Because the permanent magnet is encapsulated within the magnetic mounting base, use of an adhesive on an outer surface of the mounting base does not affect the magnet. Of course, coupling or fastening can take place when the mounting base is at a proper rotational orientation.

The next process step 208 can involve coupling the mechanical component to the magnetic mounting base. This can be done, for example, by rotatably inserting a threaded portion of the mechanical component into a threaded inner opening of the mounting base insert while the insert is fitted within the mounting base inner volume. This can include tightening the mechanical component to a proper torque such that the mechanical component is coupled to the mechanical asset at a specific rotational orientation relative to the mechanical asset. Coupling the separate mechanical component in this manner can effectively seal the threaded inner opening and thus the inner volume of the mounting base, which can result in the permanent magnet being encapsulated into a sealed, adhesive-free, spark-free, and corrosion resistant environment within the magnetic mounting base.

Summary method 200 can then end at end step 210. As noted above, the mechanical component and mechanical asset can be separate items from each other and also from the magnetic mounting base, which can be used to mount one of these separate items to the other. In some arrangements, one or more of the foregoing steps can be performed simultaneously or in a different order. For example, steps 204 and 206 can be performed simultaneously in some arrangements. Not all steps are necessary in all situations, and additional steps and details can be added. Further steps, details, and variations are provided in detailed method 500 set forth below.

Figure 3A:
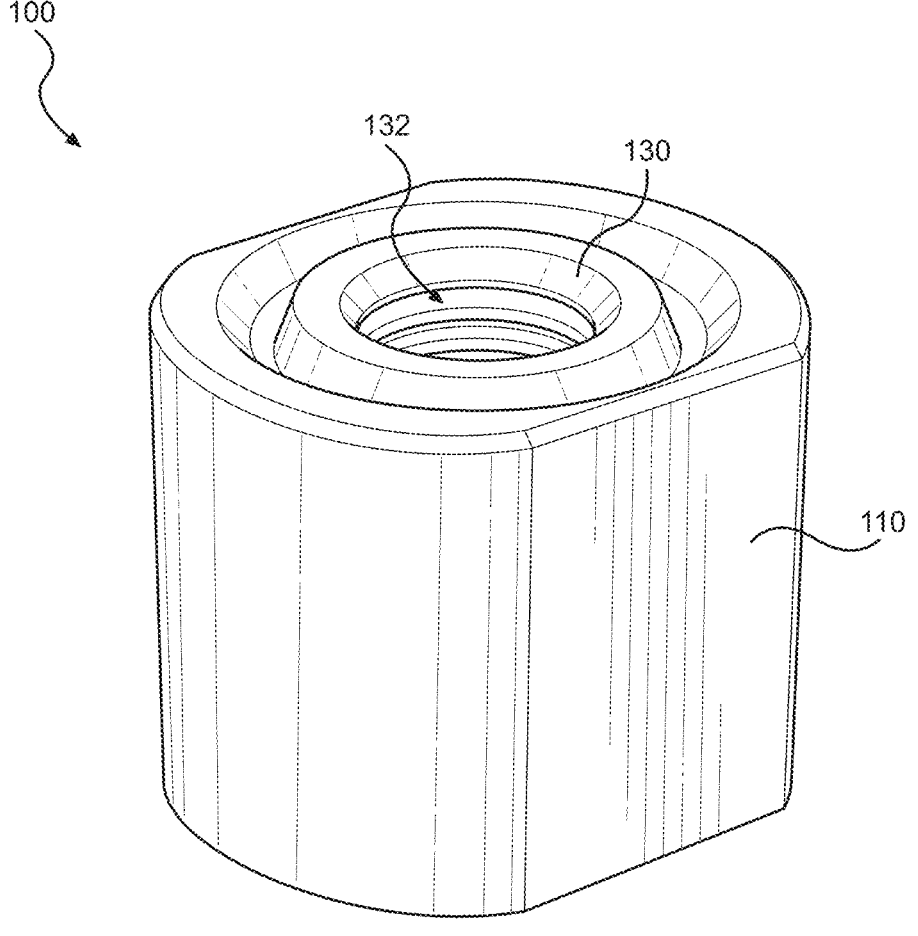
FIG. 3A illustrates in top perspective view an example magnetic mounting base according to one embodiment of the present disclosure.
Figure 3B:
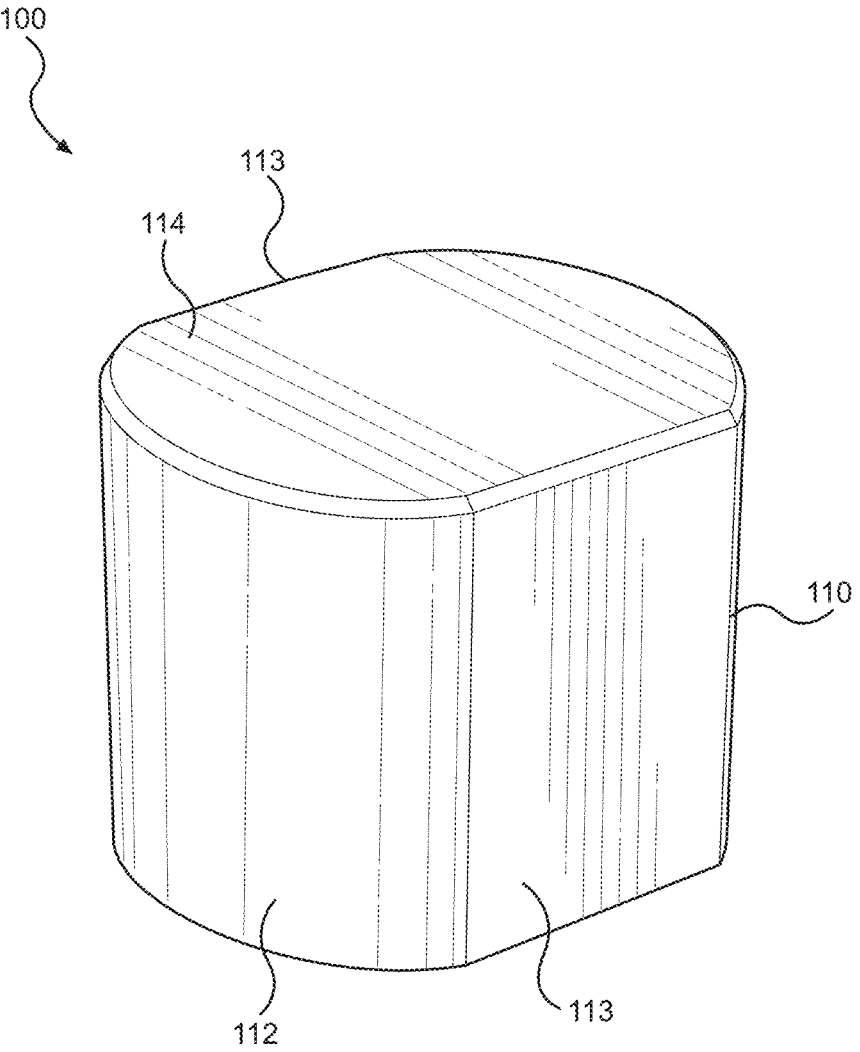
FIG. 3B illustrates in bottom perspective view the example magnetic mounting base of FIG. 3A according to one embodiment of the present disclosure.
Figure 3C:
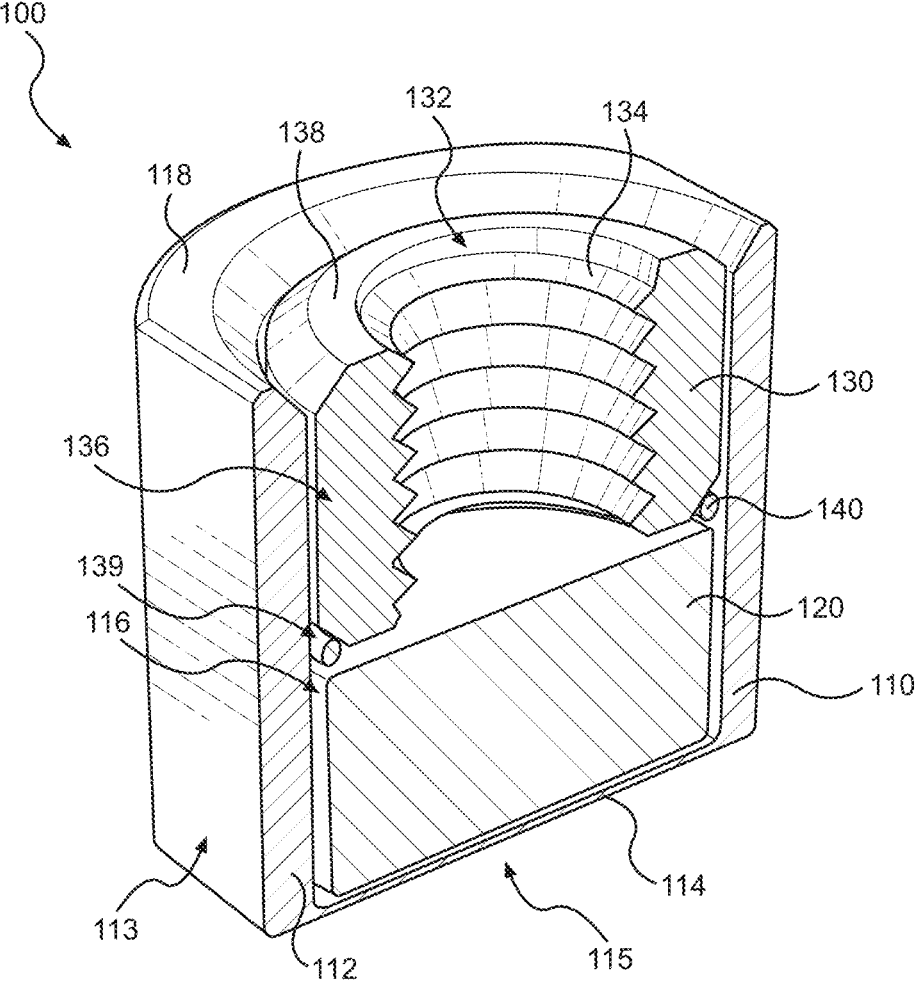
FIG. 3C illustrates in side perspective cross-section view the example magnetic mounting base of FIG. 3A according to one embodiment of the present disclosure.

Continuing with FIGS. 3A-3C, an example magnetic mounting base is illustrated in top perspective, bottom perspective, and side perspective cross-section views respectively. As noted above, magnetic mounting base 100 can be configured to mount or otherwise couple a separate mechanical component to a separate mechanical asset, such as a vibration sensor to an industrial motor. Magnetic mounting base 100 can include four components or items: an outer housing 110, a permanent magnet 120, a compression insert 130, and a retention lock 140. These four items 110, 120, 130, 140 can mechanically interlock to form a magnetic mounting base 100 having an encapsulated environment for the permanent magnet that is adhesive-free, spark-free, and corrosion-resistant. These items can interlock into a combined unit such that they are not readily disassembled from each other and can also be arranged such that there is no relative movement between the items. In some arrangements, magnetic mounting base 100 can also be configured to facilitate the ready mounting or fastening of the mechanical component to the mechanical asset at a specific rotational alignment in a simple and streamlined manner.

Outer housing 110 can include one or more walls 112 coupled to an endcap 114 at one end thereof to define inner volume 116, which can have an open end or "housing opening" at the end opposite the endcap, with a housing upper surface 118 surrounding the housing opening, among other possible features. In some arrangements, outer housing 110 can be a solid, rigid component and all of its features can be integrally formed from any suitable material, such as stainless steel 316, for example. A single fully or partially circular wall 112 can form around an outer circumference of outer housing 110, and this wall can define an outer surface that includes at least one pair of opposing flat regions 113. Such flat regions 113 can be sized and shaped to accommodate a standard size wrench or tool to facilitate a controlled rotation or held position for outer housing 110, such as when tightening a separate mechanical component into the overall magnetic mounting base 100. Endcap 114 can have an outer surface 115 that can be configured to facilitate attachment of mounting base 100 to a separate mechanical asset. For example, outer surface 115 can be substantially flat and can be configured to be welded and/or adhered to a flat surface region of the separate mechanical asset.

Permanent magnet 120 can be located within outer housing 110, such as within inner volume 116 of the outer housing. In some arrangements, permanent magnet 120 can be a solid component in the shape of a disk or a cylinder that can fit within the bottom of inner volume 116, such as up against an inner surface of endcap 114. Permanent magnet 120 can be sized and shaped to be slightly smaller than inner volume 116, such as where the inner volume can have a cylindrical shape with a diameter that is somewhat larger than the diameter of the magnet. Permanent magnet 120 can be formed from any suitable magnetic material, such as, for example, a neodymium material to facilitate a strong magnetic coupling with a separate mechanical asset. Although magnetic mounting base 100 can be welded, adhered, or otherwise fastened to the separate mechanical asset, it is also contemplated that permanent magnet 120 can generate a strong enough magnetic force to reliably couple the mounting base to the mechanical asset all on its own. Such a magnetic coupling can hold the mounting base against the mechanical asset at a preferred location and can also keep the mounting base at a preferred rotational orientation with respect to the mechanical asset in some arrangements.

Compression insert 130, which can also simply be called an "insert," can include a threaded inner opening 132 having an internal thread 134, an outer wall surface 136, an upper surface 138, and a chamfer 139 around its outer surface, among other possible features. Insert 130 and all of its features can be integrally formed from any suitable material, such as stainless steel 316, for example. As noted above, threaded inner opening 132 can be configured to accommodate a threaded portion of a separate mechanical component, such as that which is shown in FIG. 1B above. Insert 130 can be press fit, friction fitted, or otherwise placed as shown within the housing opening of outer housing 110 so that the insert is rigidly coupled to the outer housing in a manner such that the insert is laterally and rotationally fixed with respect to the outer housing. As such, outer wall surface 136 of insert 130 can be configured to form a press fit or other friction based fit with the inner surface of outer housing 110 within inner volume 116.

When permanent magnet 120 is already located within outer housing 110, press fitting compression insert 130 into the housing opening can the result in the permanent magnet being fully constrained within inner volume 116 of the outer housing. When installed properly, threaded inner opening 132 can be aligned along a central longitudinal axis of outer housing 110, and can be configured to accept a rotational insertion therein of a threaded portion of a vibration sensor or other suitable separate mechanical component. In some arrangements, upper surface 118 of outer housing 110 can be arranged such that it is flush with or higher than upper surface 138 of compression insert 130. In other words, insert 130 can have an insert upper surface 138 that is set or arranged to be lower than or flush with upper surface 118 of outer housing 110. One or both of these upper surfaces 118, 138 can be configured to provide a hard stop against a bottom surface of a separate mechanical component being installed into magnetic mounting base 100. Proper insertion of the separate mechanical component can result in the separate mechanical component being coupled to the separate mechanical asset at a specific rotational orientation relative to the separate mechanical asset.

In some embodiments, the component threads can be designed and/or oriented in such a manner to facilitate the precise final rotational orientation of the separate mechanical component with respect to the separate mechanical asset. For example, internal thread 134 of threaded inner opening 132 can be oriented such that a simple rotational insertion and torquing of a separate mechanical component threaded post results in the desired rotational orientation of the separate mechanical component with respect to the separate mechanical asset. This can be accomplished when compression insert 130 is properly press fit or otherwise affixed inside of outer housing 110, which can be done with internal thread 134 at a desired proper orientation with respect to flat regions 113 around the outside of the outer housing. When outer housing 110 is then set at a desired rotational orientation with respect to the separate mechanical asset by using flat regions 113, internal thread 134 will be properly oriented such that insertion of the separate mechanical component results in the desired precise rotational orientation of the mechanical component with respect to the mechanical asset.

As shown in FIG. 3C, a gap or clearance can exist between an upper surface of permanent magnet 120 and a bottom surface of compression insert 130. Such a small gap can be preferable to prevent or limit contact, damage, or other issues with respect to relatively sensitive material in the magnet, such as during assembly, installation, and/or operation of magnetic mounting base 100. It can still be preferable to prevent or limit vibration and relative movement of the magnet within inner volume 116 during use. Retention lock 140 can be located between permanent magnet 120 and compression insert 130, such as at a bottom chamfer 129 around an outer circumference of the compression insert. Retention lock 140 can contact both of the permanent magnet 120 and the compression insert 130 and can be somewhat compressible, such that the compression lock can limit or prevent vibrations to the magnet as well as axial or rotational displacement of the magnet within the mounting base during use. Retention lock 140 can be a rubber or silicone O-ring that is sized and shaped to conform to the geometries of permanent magnet 120 and compression insert 130 to achieve these objectives. Other materials and other types of mechanisms to facilitate a retention lock are also possible.

As will be readily appreciated by those of skill in the art, the press-fit mechanical assembly of the disclosed magnetic mounting base 100 can ensure that permanent magnet 120 is fully enclosed and immobilized (i.e., encapsulated) within the inner volume 116 of the structure when a threaded post of a separate mechanical component is inserted into internal thread 134 of compression insert 130. This can thus create a sealed, adhesive-free, spark-free, and corrosion-resistant environment for the magnet within the mounting base suitable for hostile and hazardous industrial environments. By eliminating adhesives and moving components from exposure or contact with the magnet and simplifying the assembly process, the disclosed mounting base 100 can improve manufacturability, reliability, product lifespan, and operational safety.

In various embodiments, outer housing 110 and compression insert 130 can be similar in some ways to the sleeve and insert detailed in U.S. patent application Ser. No. 19/297,904 filed on Aug. 12, 2025, titled "SELF-ALIGNING THREADED MOUNTING ASSEMBLY;" which application is again hereby incorporated by reference in its entirety herein. For example, installation of mechanical component 10 to magnetic mounting base 100 can involve a bottom surface of the mechanical component contacting and torquing against upper surface 118 of outer housing 110. Due to the size, shape, and geometry of outer housing 110, this can sometimes result in just an "outer ring" of contact between mechanical component 10 and mounting base 100. As may be appreciated by those of skill in the art, increased mounting and fixture stiffness in the installed arrangement can be realized when the mechanical component contacts and is torqued only or primarily against outer housing upper surface 118, due to the relatively larger diameter of outer housing 110 and the geometrical nature of the various mounting assembly components. As will also be appreciated, increased mounting or fixture stiffness can ensure that an installed vibration sensor or other mechanical component can operate and respond robustly as designed within the overall arrangement. For example, ensuring that an installed vibration sensor contacts outer housing 110 directly can establish a more reliable mechanical link between the sensor, the magnetic mounting base, and ultimately the mechanical asset, which can then result in more consistent vibration transmission from asset to sensor.

Accordingly, compression insert 130 can be positioned somewhat lower within outer housing 110 such that its insert upper surface 138 is at a level that is below the level of outer housing upper surface 118, such as during formation of magnetic mounting base 100. In various arrangements, this can mean that mechanical component 10 never contacts compression insert upper surface 138. In other arrangements, contact and torque from the bottom surface of mechanical component 10 can also occur against upper surface 138 of compression insert 130, such as where the insert upper surface 138 is at or becomes flush with the outer housing upper surface 118. In the event that outer housing upper surface 118 is at a somewhat higher level than insert upper surface 138, for example, it may be possible in some situations that torquing mechanical component 10 into mounting base 100 can result in the bottom surface of the mechanical component initially contacting and torquing only against the outer housing upper surface but then contacting and torquing against both outer housing and insert upper surfaces before torquing is completed.

As noted above, compression insert 130 can be press fit, friction fit, or otherwise affixed inside of outer housing 110 such that these components are firmly affixed with respect to each other. This can result in no lateral movement or rotational displacement of insert 130 within outer housing 110. In some arrangements, this can involve a sufficiently strong press or friction fit such that no welding, glue, or other adhesives are used. In other arrangements, a suitable glue, adhesive, and/or weld can be used to facilitate affixing compression insert 130 to outer housing 110. For example, compression insert 130 can be press or friction fit into outer housing 110, whereupon a ring weld can then be formed between the compression insert and outer housing along the upper juncture between them. As shown in FIG. 3C, such a ring weld (not shown) could be formed below both outer housing upper surface 118 and compression insert upper surface 138 due to the beveling along the upper regions of both outer housing 110 and compression insert 130. As will be readily appreciated, this can provide another reason as to why it may be preferable for outer housing upper surface 118 to be above or flush with compression insert upper surface 138, since initial contact and torque of the sensor or other mechanical component against only the insert upper surface may raise the risk of weld fatigue or other relative press fit stability of insert 130 within outer housing 110.

Figure 4A:
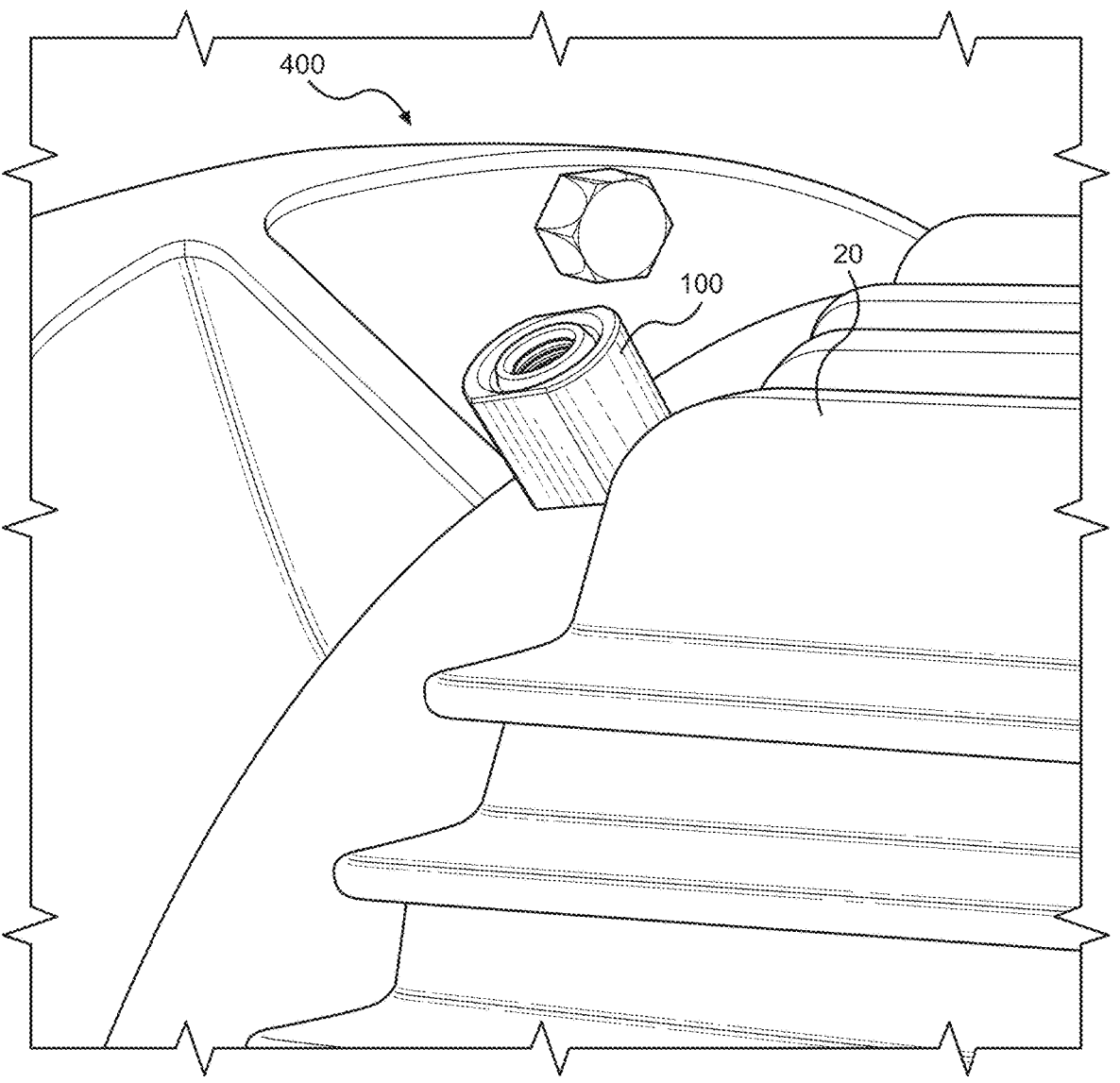
FIG. 4A illustrates in front perspective view an example magnetic mounting base coupled to a separate industrial motor according to one embodiment of the present disclosure.
Figure 4B:
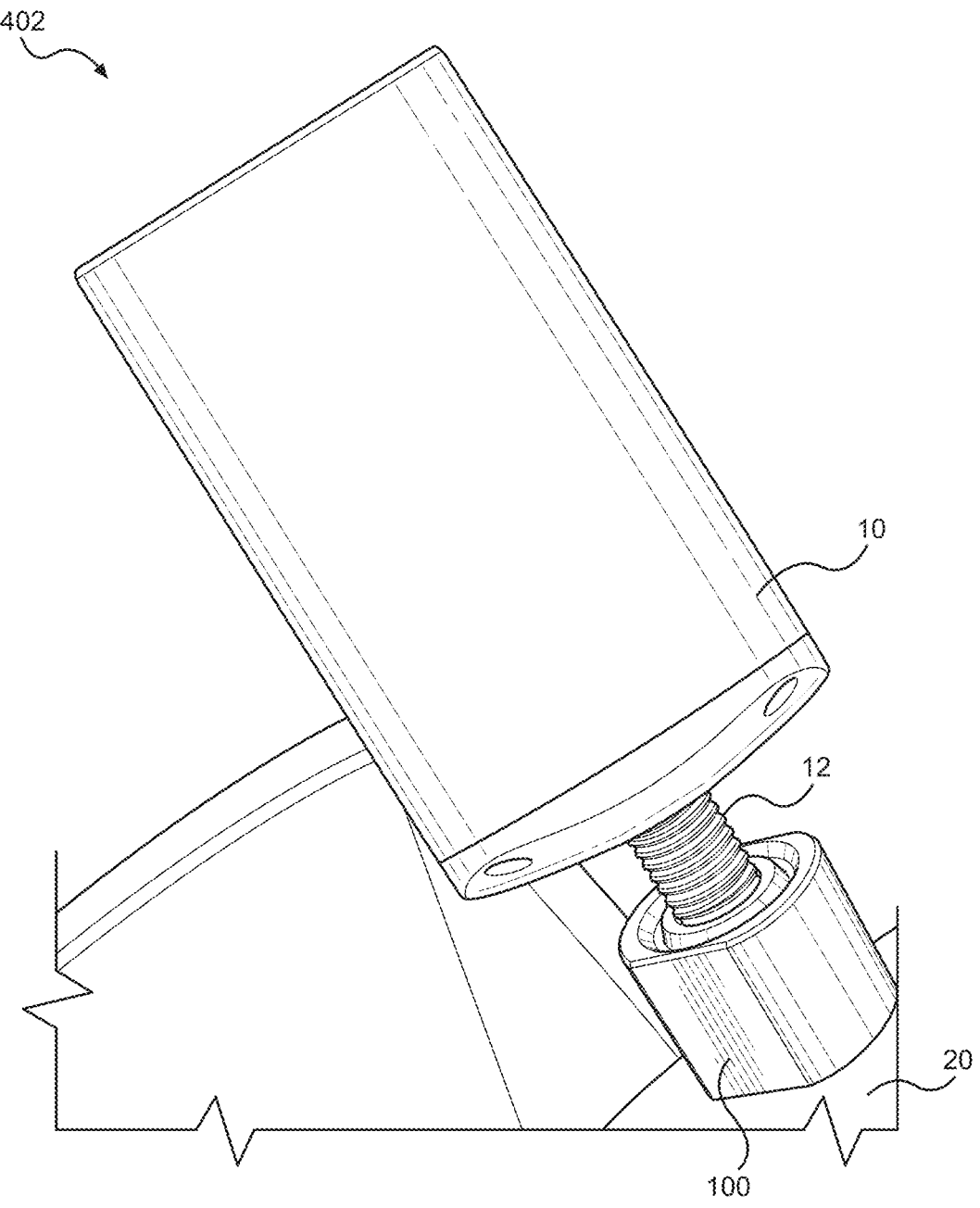
FIG. 4B illustrates in front perspective view an example step of coupling a separate vibration sensor to the example magnetic mounting base of FIG. 4A to mount the separate vibration sensor to the separate industrial motor using the magnetic mounting base according to one embodiment of the present disclosure.

FIGS. 4A and 4B illustrate in front perspective view various stages of mounting a mechanical component to a mechanical asset using a magnetic mounting base as shown and described herein. FIG. 4A shows a magnetic mounting base coupled to an industrial motor, while FIG. 4B shows the step of coupling a vibration sensor to the magnetic mounting base to result in mounting the vibration sensor to the industrial motor using the magnetic mounting base. Again, other mechanical components and mechanical assets besides a vibration sensor and/or an industrial motor can alternatively be used.

Configuration 400 of FIG. 4A reflects magnetic mounting base 100 being coupled to a separate mechanical asset 20, which can be an industrial motor, for example. Such a coupling can simply reflect an outer surface of magnetic mounting base 100 being fastened or affixed to a suitable outer surface region of separate mechanical asset 20. In some arrangements, this can involve welding the outer surfaces together. In some arrangements, this can involve gluing or otherwise adhering the outer surfaces together. As noted above, a bottom surface of the mechanical mounting base outer housing can be welded, glued, adhered, affixed, fastened, or otherwise coupled to a suitable outer surface region of the mechanical asset. Both outer surfaces can be flat or can otherwise have suitably matching geometries to facilitate a solid attachment. As also noted above, magnetic mounting base 100 can comprise four interlocking components that are readily operable as a combined unit.

Configuration 402 of FIG. 4B reflects the step of coupling a vibration sensor or other separate mechanical component 20 to magnetic mounting base 100. Such a coupling can produce a result of mounting separate mechanical component 10 (e.g., a vibration sensor) to separate mechanical asset 20 (e.g., an industrial motor) using magnetic mounting base 100. As shown, a threaded post or portion 12 of separate mechanical component 10 can be rotationally inserted into a threaded internal opening of magnetic mounting base 100. In some arrangements, threaded portion 12 can be rotationally fixed with respect to the rest of separate mechanical component 10 such that the entire mechanical component can be rotated or twisted to insert its threaded portion into the threaded internal opening. This can be done until a bottom surface of the vibration sensor or other separate mechanical component 10 contacts upper surface(s) of the magnetic mounting base 100, at which point the separate mechanical component can then be tightened to a suitable desired torque. As will be readily appreciated, this can involve the use of a box wrench or other suitable tool to tighten separate mechanical component 10 in place.

In some arrangements, a separate mechanical component 10 can be coupled to a magnetic mounting base 100 prior to these coupled items being fastened or otherwise coupled as a combined arrangement to a separate mechanical asset 20. Such a pre-coupling of mechanical component 10 and magnetic mounting base 100 can also involve tightening the mechanical component into the mounting base to a desired torque value. These combined items can then be affixed or coupled to the mechanical asset while the mechanical component being set at an appropriate rotational orientation relative to the asset, if desired.

As shown and described in detail above, magnetic mounting base 100 generally provides an improved threaded coupling arrangement between its internal threaded opening and a threaded post of a separate mechanical component, which arrangement can provide precise rotational alignment as well as various detailed technical benefits. For example, magnetic mounting base 100 can be scalable as desired for different applicational needs and can provide a single unit of interlocking mechanical parts that eliminates the need for multiple separate parts to be assembled on site. Magnetic mounting base 100 can be configured to maintain alignment of a separate mechanical component axis (e.g., vibration sensor threaded post axis) even during maintenance or partial disassembly of the separate mechanical component, separate mechanical asset, and/or magnetic mounting base.

No adhesives are required to couple the separate mechanical component to the mounting base, and no thread of any component is exposed after full mounting is completed. Field serviceability is also enhanced, as the separate mechanical component can be removed or replaced without disturbing the underlying magnetic mounting base as already fastened to the separate mechanical asset. Manufacturing scalability is also enhanced, as the interference-fit design can simplify assembly of the mounting base and reduce dependency on the need for torque precision or additional locking features or components. Other advantages of disclosed magnetic mounting base 100 over existing mounting arrangements that provide for precise rotational orientations and secure encapsulation of magnetic materials will be readily apparent to those of skill in the art.

Figure 5:
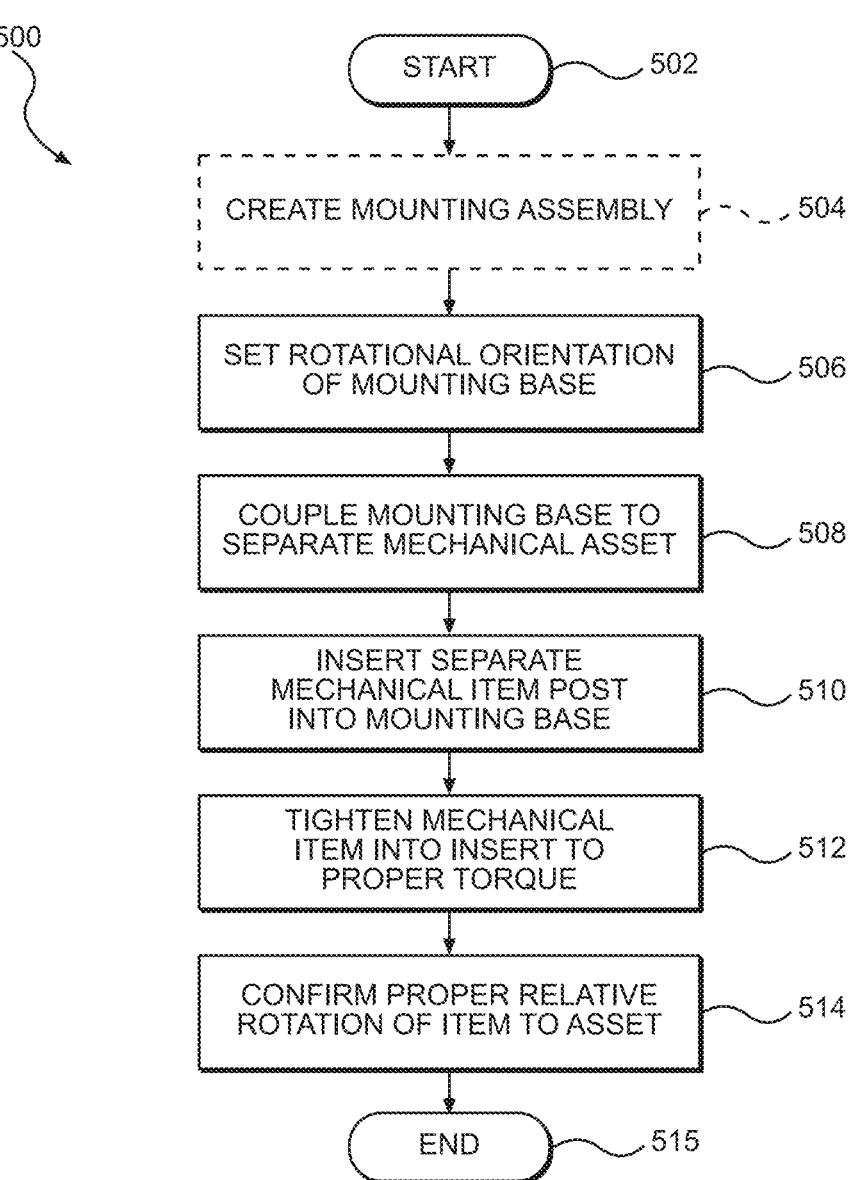
FIG. 5 illustrates a flowchart of an example detailed method of mounting a mechanical component to a mechanical asset using a magnetic mounting base according to one embodiment of the present disclosure.

Lastly, FIG. 5 illustrates a flowchart of an example detailed method of mounting a mechanical component to a mechanical asset using a magnetic mounting base. Detailed method 500 can represent one possible way of mounting a mechanical component to a mechanical asset, and it will be understood that various other steps, features, and details of such a detailed method are not provided here for purposes of simplicity. Detailed method 500 can include some or all steps and details of summary method 200 above, as will be readily appreciated. While detailed method 500 contemplates mounting a vibration sensor to an industrial motor, for example, it will be readily appreciated that other mechanical components and/or other mechanical assets can alternatively be used.

After start step 502, a first optional process step 504 can involve creating a mounting base. This can involve creating magnetic mounting base 100 as illustrated and described above using four different interlocking components. For example, a separate permanent magnet 120 can be inserted into a separate outer housing 110 such that it rests at the bottom of an outer housing internal volume. A properly sized retention lock 140 (e.g., rubber or silicone O-ring) can then be placed atop the permanent magnet. A separate compression insert 130 can then be press fit or otherwise inserted into the outer housing 110 such that the permanent magnet 120 is fully constrained therein. This can result in the retention lock being slightly compressed between the permanent magnet and the compression insert. Process step 504 can be optional, such as in situations where a finished magnetic mounting base does not already exist.

At the next process step 506, a rotational orientation of the mounting base with respect to the mechanical asset can be set. Step 506 can be identical or substantially similar to step 204 above in some arrangements. This can again involve setting a rotational orientation of the magnetic mounting base with respect to the separate mechanical asset. Setting the rotational orientation can involve setting a rotational orientation of a mounting base outer housing with respect to the mechanical asset, such as by adjusting the outer housing such that flat regions or other notable features on the outside of the outer housing are at a desired rotational orientation and/or location with respect to the mechanical asset.

Subsequent process step 508 can involve coupling the magnetic mounting base to a separate mechanical asset. Step 508 can be identical or substantially similar to step 206 above in some arrangements. Again, this can involve fastening an outer surface of the mounting base outer housing, such as a flat surface at the bottom of the outer housing, to a designated surface on the mechanical asset. Fastening can involve any suitable fastening method, such as welding, gluing, or otherwise adhering, for example, among other possible fastening techniques.

At the next process step 510, a threaded portion or post of the separate mechanical component or item can be inserted into an insert of the magnetic mounting base. Step 510 can be identical or substantially similar to at least a portion of step 208 above in some arrangements. This can involve rotatably inserting a threaded portion of the mechanical component into a threaded inner opening of the mounting base compression insert while the insert is fitted within a housing opening of the mounting base. Again, inserting the separate mechanical component in this manner can effectively seal the threaded inner opening and thus the inner volume of the mounting base, which can result in the permanent magnet being encapsulated into a sealed, adhesive-free, spark-free, and corrosion resistant environment within the mounting base.

Process step 512 can involve tightening the separate mechanical component or item into the magnetic mounting base to a proper torque value. Step 512 can also be identical or substantially similar to at least a portion of step 208 above in some arrangements. Such a tightening step can be done using a box wrench or other suitable tool to rotate the vibration sensor or other mechanical component such that its threaded portion rotates into the threaded inner opening of the magnetic mounting base to the proper torque amount. This can result in a bottom surface of the mechanical component contacting one or more upper surfaces of the mounting base, such as upper surfaces at one or both of an outer housing and compression insert of the mounting base. Tightening the proper torque amount can result in coupling the mechanical component to the mechanical asset at a specific rotational orientation relative to the mechanical asset.

The next process step 514 can involve confirming a proper relative rotational orientation of the separate mechanical component with respect to the separate mechanical asset. This can involve visually inspecting both items to ensure that the vibration sensor or other separate mechanical component is properly oriented as desired with respect to the industrial motor or other separate mechanical asset. Automated sensing or detection components can be used to measure such a rotational orientation if desired. In the event that a proper relative rotational orientation has not been achieved, then the separate mechanical component and/or the magnetic mounting base can be loosened and various steps can be repeated as may be necessary, as will be readily appreciated by those of skill in the art.

The method can then end at step 516. For foregoing detailed method 500, it will be appreciated that not all process steps are necessary, and that other process steps may be added in some arrangements. For example, step 504 is unnecessary where a fully assembled mounting base already exists. Steps can also be performed in different orders where practical, and some steps can be performed simultaneously. For example, steps 506 and 508 can be performed at the same time. In some arrangements, steps 510 and 512 can be performed prior to steps 506 and 508, such that a combined mechanical component and magnetic mounting base are attached to the mechanical asset. Although known process steps are provided for the various techniques in detailed method 500, it will be appreciated that other similar methods for mounting a mechanical component to a mechanical asset using a magnetic mounting base are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. A mounting base, comprising:

an outer housing having one or more walls coupled to an endcap at one end thereof to define an inner volume having a housing opening at another end opposite the endcap, the outer housing having a longitudinal axis therethrough, wherein the endcap includes an outer surface configured to facilitate attachment of the mounting base to a separate mechanical asset;

a permanent magnet located within the inner volume proximate the endcap, wherein the permanent magnet is configured to generate a magnetic force with respect to the separate mechanical asset to facilitate holding the mounting base against the separate mechanical asset;

a compression insert fitted within the housing opening such that the permanent magnet is constrained within the inner volume, the compression insert including a threaded inner opening aligned along the longitudinal axis and configured to accept a rotational insertion therein of a threaded portion of a separate mechanical component such that the separate mechanical component is coupled to the separate mechanical asset, wherein full insertion of the separate mechanical component into the threaded inner opening encapsulates the permanent magnet within the mounting base, and wherein the compression insert is rigidly coupled to the outer housing within the housing opening such that the compression insert is laterally and rotationally fixed with respect to the outer housing; and a retention lock located within the inner volume between the compression insert and the permanent magnet, wherein the retention lock contacts both the compression insert and the permanent magnet and prevents movement of the permanent magnet within the inner volume.

2. The mounting base of claim 1, wherein the separate mechanical asset is an industrial engine and the separate mechanical component is a vibration sensor.

3. The mounting base of claim 1, wherein the endcap outer surface is configured to be adhered to the separate mechanical asset using an adhesive.

4. The mounting base of claim 1, wherein the endcap outer surface is configured to be welded to the separate mechanical asset.

5. The mounting base of claim 1, wherein the mounting base is configured such that full insertion of the separate mechanical component into the threaded inner opening results in the separate mechanical component being coupled to the separate mechanical asset at a specific rotational orientation relative to the separate mechanical asset.

6. The mounting base of claim 1, wherein the one or more walls of the outer housing define an outer surface that includes at least one pair of opposing flat regions.

7. The mounting base of claim 1, wherein the compression insert is press fit within the outer housing.

8. The mounting base of claim 1, wherein the outer housing includes an upper surface configured to contact and provide a physical stop against a bottom surface of the separate mechanical component when the threaded portion of the separate mechanical component is inserted into and sufficiently rotated within the threaded inner opening.

9. The mounting base of claim 8, wherein the compression insert has an upper surface arranged to be lower than or flush with the upper surface of the outer housing.

10. The mounting base of claim 1, wherein the outer housing is stainless steel, the permanent magnet is neodymium, the compression insert is stainless steel, and the retention lock is rubber.

11. The mounting base of claim 1, wherein encapsulating the permanent magnet within the mounting base results in a permanent magnet environment that is sealed, adhesive-free, spark-free, and corrosion resistant.

12. A mounting base, comprising:

an outer housing having one or more walls coupled to an endcap at one end thereof to define an inner volume having a housing opening at another end opposite the endcap, the outer housing having a longitudinal axis therethrough, wherein the endcap includes an outer surface configured to facilitate attachment of the mounting base to a separate mechanical asset;

a permanent magnet located within the inner volume proximate the endcap, wherein the permanent magnet is configured to generate a magnetic force with respect to the separate mechanical asset to facilitate holding the mounting base against the separate mechanical asset;

a compression insert fitted within the housing opening such that the permanent magnet is constrained within the inner volume, the compression insert including a threaded inner opening aligned along the longitudinal axis and configured to accept a rotational insertion therein of a threaded portion of a separate mechanical component such that the separate mechanical component is coupled to the separate mechanical asset, wherein an internal thread of the threaded inner opening has a rotational orientation arranged to match an exterior feature of the outer housing, and wherein full insertion of the separate mechanical component into the threaded inner opening encapsulates the permanent magnet within the mounting base; and a retention lock located within the inner volume between the compression insert and the permanent magnet, wherein the retention lock contacts both the compression insert and the permanent magnet and prevents movement of the permanent magnet within the inner volume.

13. The mounting base of claim 12, wherein tightening the threaded portion of the separate mechanical component into the threaded inner opening of the compression insert to a specified torque value results in achieving an exact rotational orientation of the separate mechanical component relative to the exterior feature of the outer housing.

14. The mounting base of claim 12, wherein the compression insert is rigidly coupled to the outer housing within the housing opening such that the compression insert is laterally and rotationally fixed with respect to the outer housing.

15. An adhesive-free encapsulated magnetic mounting base configured to mount a separate mechanical component to a separate mechanical asset, the magnetic mounting base comprising:

a housing having one or more walls coupled to an endcap to define an inner volume having a housing opening opposite the endcap, wherein the endcap includes an outer surface configured to facilitate attachment of the adhesive-free encapsulated magnetic mounting base to a separate mechanical asset;

a magnet located within the inner volume proximate the endcap, wherein the magnet is configured to generate a magnetic force with respect to the separate mechanical asset to facilitate holding the adhesive-free encapsulated magnetic mounting base against the separate mechanical asset; and an insert fitted within the housing opening such that the magnet is constrained within the inner volume, the insert including a threaded inner opening configured to accept insertion of a threaded portion of a separate mechanical component, wherein a specific rotational orientation of the separate mechanical component is achieved automatically when the separate mechanical component is tightened into the threaded inner opening at a designated preset torque value.

16. The adhesive-free encapsulated magnetic mounting base of claim 15, wherein the magnet is isolated from an ambient environment outside the adhesive-free encapsulated magnetic mounting base when the separate mechanical component is tightened into the threaded inner opening.

17. The adhesive-free encapsulated magnetic mounting base of claim 15, wherein the insert is rigidly coupled to the housing within the housing opening such that the insert is laterally and rotationally fixed with respect to the housing.

18. A method of mounting a separate mechanical component to a separate mechanical asset using the mounting base of claim 1, the method comprising:

setting a rotational orientation of the mounting base with respect to the separate mechanical asset;

fastening the mounting base to the separate mechanical asset; and coupling the separate mechanical component to the mounting base by rotatably inserting a threaded portion of the separate mechanical component into the threaded inner opening of the compression insert while the compression insert is fitted within the inner volume of the outer housing such that the permanent magnet is encapsulated in a sealed, adhesive-free, spark-free, and corrosion resistant environment within the mounting base.

19. The method of claim 18, wherein coupling the separate mechanical component to the mounting base results in coupling the separate mechanical component to the separate mechanical asset at a specific rotational orientation relative to the separate mechanical asset.

20. The method of claim 18, further comprising the steps of:

creating the mounting base;

tightening the separate mechanical component into the compression insert to a proper torque; and confirming that a specific rotational orientation of the separate mechanical component is a proper relative rotation of the separate mechanical component to the separate mechanical asset.

*   *   *   *   *